United States Patent [19]
Moorehead

[11] 3,920,934
[45] Nov. 18, 1975

[54] IDLE/BUSY STATUS DETECTOR FOR A TELEPHONE SWITCHING NETWORK

[75] Inventor: Thomas J. Moorehead, Brockville, Canada

[73] Assignee: GTE Automatic Electric (Canada) Limited, Brockville, Canada

[22] Filed: Sept. 27, 1974

[21] Appl. No.: 510,251

[52] U.S. Cl. .................... 179/175.2 R; 340/174 M; 179/175.2 C
[51] Int. Cl.$^2$ .................... H04M 3/08
[58] Field of Search ...... 179/175.2 C, 175, 175.2 R; 340/174 M, 174 TC

[56] References Cited
UNITED STATES PATENTS

| | | | |
|---|---|---|---|
| 3,587,070 | 6/1971 | Thomas | 340/174 M |
| 3,772,663 | 11/1973 | Shaver | 340/174 M |

*Primary Examiner*—Douglas W. Olms
*Attorney, Agent, or Firm*—John T. Winburn

[57] ABSTRACT

A status detector control comprises temporary storage to receive a sense point address which is coupled to decoders to decode the particular sense point address. A second temporary storage is provided to store the status of an addressed sense point. An error register is provided to store an error signal when a fault detector is coupled to the circuit. A decoded address (units and tens) is coupled from the status detector control to a decoder driver which drives a status detector driver. If fault detection is provided in the circuitry, it is coupled to the status detector driver circuitry. The status detector driver output is coupled through the sense points to a receiver. This receiver comprises a pulse transformer with the secondary coupled to the sense points and coupled via three diodes to ground. A strobe signal produced by the status detector control strobes the primary of the pulse transformer which is output to Schmitt triggers. The output of the Schmitt triggers is coupled to a multiplexer with the decoded address (hundreds and thousands) from the status detector control. The output of the multiplexer is coupled in the status detector control to store the status of the addressed sense points.

5 Claims, 14 Drawing Figures

IDLE/BUSY STATUS DETECTOR FOR A TELEPHONE SWITCHING NETWORK

BACKGROUND OF THE INVENTION

1. Field of the Invention

The invention relates to the detection of the status of network elements for a telephone communication switching system, and more particularly to detect the busy or idle status of an element and storing such status separate from a volatile memory.

2. Description of the Prior Art

The invention was developed for the system shown in U.S. Pat. No. 3,767,863, issued Oct. 23, 1973, by Borbas et al for a Communication Switching System with Modular Organization and Bus, hereinafter referred to as the System S2 patent.

A previous system is described in U.S. Pat. No. 3,487,173, issued Dec. 30, 1969, by Duthie et al for a Small Exchange Stored Program Switching System, hereinafter referred to as the System S1 patent. An improvement on System S1 is shown in U.S. Pat. No. 3,772,663, issued Nov. 13, 1973, by Shaver for a Status Detector and Memory Arrangement.

In many electronic controlled switching systems, information concerning the busy or idle status of network elements (links, junctors, or trunks) is stored in the System Common Control as a network "map", in volatile (destroyable) memory. This has the disadvantage of requiring considerable amounts of program and program memory as well as central processor time for internal checking of the memory. Further, this memory is not a real time representation of the network. Its information must be updated periodically by the central processor requiring still more processor time.

For System S1 and the system of Shaver, as well as for System S2, this status information is in effect left in the network until needed to process a connection. The status detector under control of the central processor must retrieve this information from the electromechanical elements of the network. In System S1 and the Shaver system the program memory drivers and receivers were used to obtain this status from the network. Field experience with these systems has shown this not to be a reliable method. The drivers were easily destroyed by network foreign potentials (−50 volts and grounds). Further, this driver arrangement was economically impossible to protect. Once failure occurred, both the status detector and memory were affected, making trouble shooting very difficult.

The System S2 provides separate status detector hardware protected and improved, both from a reliability and speed of operation point of view.

SUMMARY OF THE INVENTION

According to the invention, a status detector control is provided with temporary storage and decoding to receive and decode a sense point address, and temporary storage to store the status of that sense point. The decoded address is coupled through a decoder driver and then to a status detector driver. The status detector driver may also be coupled to a fault detector which protects the status detection hardware and also produces a system error signal. The output of the status detector driver is coupled through the sense point to a receiver. The receiver is a pulse transformer with the secondary held above ground by three diodes for noise immunity and connected to the sense points. The primary is strobed with a signal from the status control and the status of the sense point is stored in the temporary storage of the status control. When the sense points are closed providing continuity, the transformer will be saturated when the strobe is produced which provides a voltage across a resistor to activate a Schmitt trigger. The Schmitt trigger output is coupled through a multiplexer to the temporary storage in the status detector control.

A first object of the invention is to provide a status detector which is separate from the system volatile memory.

A second object of the invention is to provide a status detector which is separate from all other subsystems.

A third object of the invention is to provide fault detection for the status detector.

A fourth object of the invention is to provide protection for the matrix diodes in the sense points.

A fifth object of the invention is to provide improved noise immunity for a status detector.

A sixth object of the invention is to provide protection for the status detector from negative potentials.

A seventh and final object of the invention is to provide protection for the status detector from unintentional grounds.

BRIEF DESCRIPTION OF THE DRAWINGS

The above-mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENT

Figure 1:
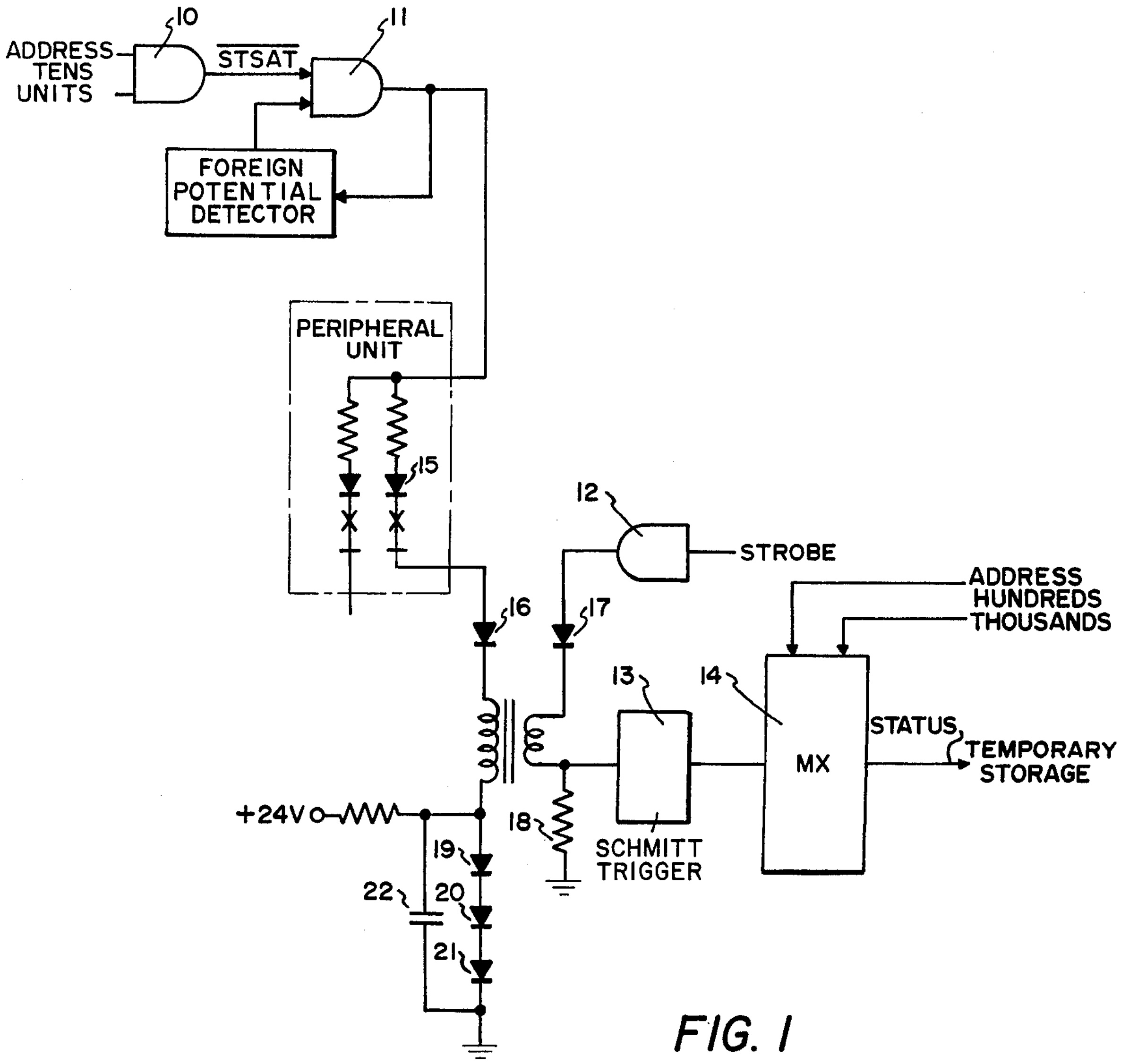
FIG. 1 is a functional block diagram of the invention.

FIG. 1 shows a functional block diagram of the invention. The address tens and units are input to a decoder driver (DDR) 10 which provides driver output for the status detector drivers (SDD) 11. A foreign potential detector may be also coupled to the SDD 11 as will be further explained later. The SDD output is coupled through the sense points in the peripheral units (two of which are shown) to the receiver (RVR). The sense points include matrix diodes such as diode 15. These peripheral units which include the sense points (relay contacts) are line circuits, originating junctors (OJ), terminating junctors (TJ), and register junctors (RJ). Two of these sense points are arranged to provide a two bit status signal. The start saturation pulse ($\overline{STSAT}$) is coupled through the driver selected by the tens and units which produces a 9 microsecond positive pulse to the sense contacts. If the test contacts are closed, providing continuity, the transformer secondary will be saturated. This pulse transformer is held above ground by the three diodes 19–21 for noise immunity. After allowing sufficient time for saturation of the pulse transformer secondary, the primary is strobed with a 1 microsecond positive pulse (STROBE) through strobe driver 12 and diode 17. If the secondary is saturated a voltage will be produced across the sense resistor 18 sufficient to activate Schmitt trigger 13. The status of all 12 hundreds groups has been presented to multiplexer 14 where the correct thousands group and hundreds group is selected by the address signal hundreds and thousands and the two bit status is passed on to the temporary storage where the information may be retrieved by the central processor.

Figure 2:
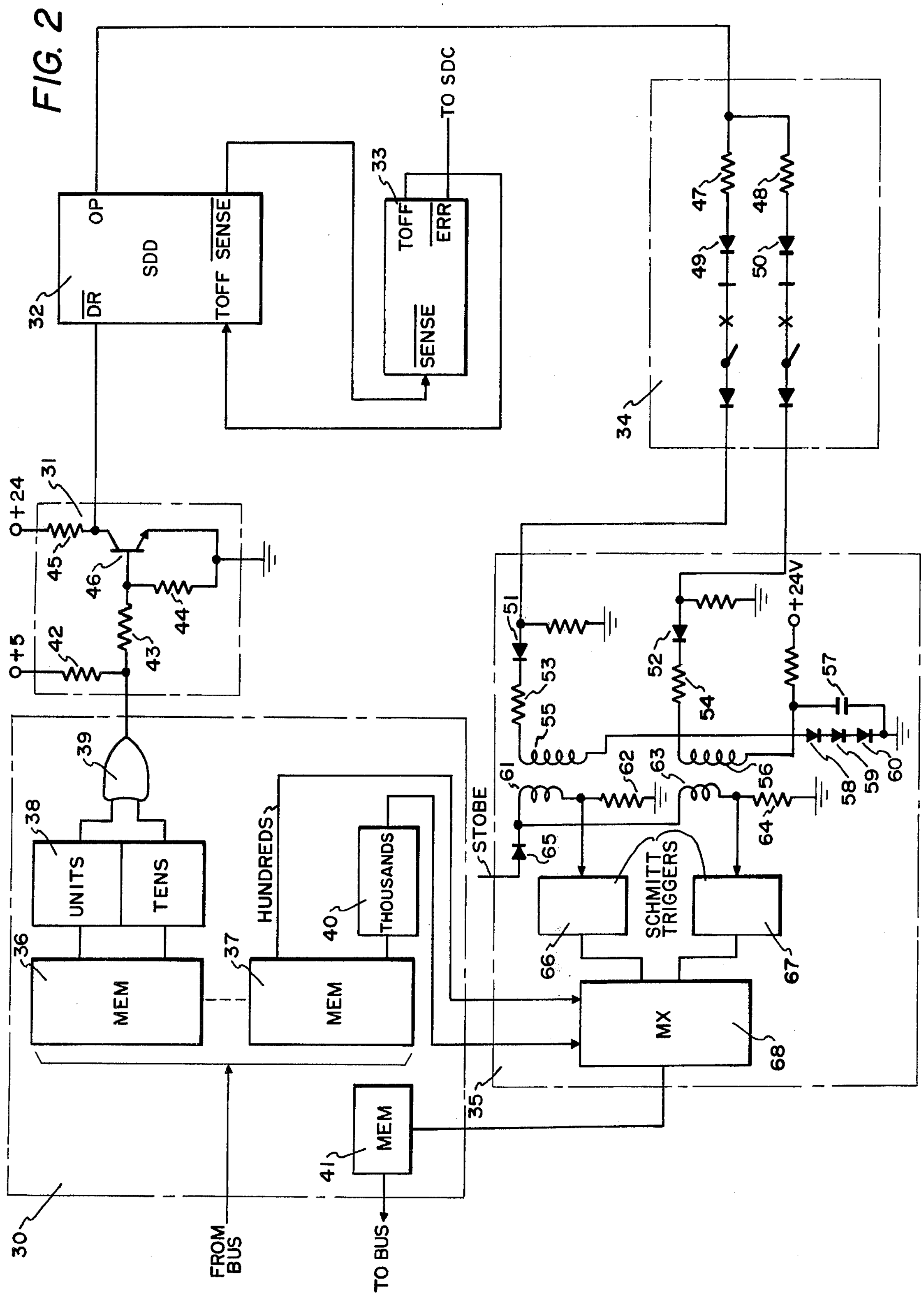
FIG. 2 is a more detailed block diagram of the invention.

FIG. 2 shows a more detailed block diagram of the invention. The major components are status detector control (SDC) 30, DDR 31, SDD 32, fault detector 33, peripheral units 34, and receiver 35.

The SDC receives and decodes the address of the sense points to be monitored. Temporary address storage is provided in units 36 and 37 for the SDC. Decoding of the units and tens outputs are shown in decoder 38 which is output through NOR gate 39 to the DDR. The hundreds and thousands decoding from temporary storage 37 and thousands decoder 40 are sent to receiver 35. In general one receiver grouping, as represented by 35 is provided for each thousand group. The STC will also provide all timing pulses such as $\overline{STSAT}$ and STROBE. It will also receive, filter, and store error indications from the SDD when that is provided in the system. Also in temporary storage 41 the two bit status of the sense point is stored.

The DDR is shown comprised of resistors 42–45, and transistor 46, NOR gate 39 could also be in this circuit instead of in SDC 30. From the tens and units input the DDR provides one driver output for each combination and may drive up to four SDD circuits. The output from the DDR turns on one SDD circuit of a group. The DDR and SDD circuits are provided in multiples depending on a system size.

The SDD 32 produces a +24 volt pulse of the same duration as signal $\overline{STSAT}$ (nominal 9 microseconds). The output of SDD, signal OP attempts to pass through the sense points (contacts) of the equipment under interrogation. The SDD also provides the hookup for fault detector 33 which is a foreign potential detector.

The fault detector 33 may be provided with the circuit as desired. Previous circuits did not have any fault detection in the status detector circuit. The error signal from this circuit $\overline{ERR}$ is sent back to the SDC. Further details of the fault detector and its connections may be found in co-pending application to Moorehead for a Status Detector Fault Detection, Ser. No. 510,110, filed the same day as this application.

The signal OP is coupled to the peripheral unit 34 and will pass through to the receiver 35 when the contacts are closed (continuity). Resistors 47 and 48 provide protection for the matrix diodes 49 and 50 of the sense points.

The pulse proceeds through an offset circuit to ground. The pulse transformers 55 and 56 are held above ground by the diodes 58–60 as previously noted. Nine microseconds is long enough to charge all cable capacitance and saturate the transformer. After 8 microseconds the STROBE signal is produced to pulse the primaries 61 and 63 of the pulse transformers. If a transformer is saturated the pulse will pass through the transformer and produce a voltage across resistors 62 and 64 sufficient to overcome the threshold of the Schmitt triggers 66 and 67. These will produce a pulse of 500 nanoseconds (minimum) to multiplexer system 68. One multiplexer is provided in 68 for each status bit. With the multiplexers enabled, this pulse passes through and is stored in the temporary storage 41 of the SDC. The SDC then produces a pulse indicating to the processor that the data is ready. The dual triggers and transformers are used to record a two bit status which will be further explained later. The system will of course work as shown in FIG. 1, with only a single coil and trigger.

Figure 3:
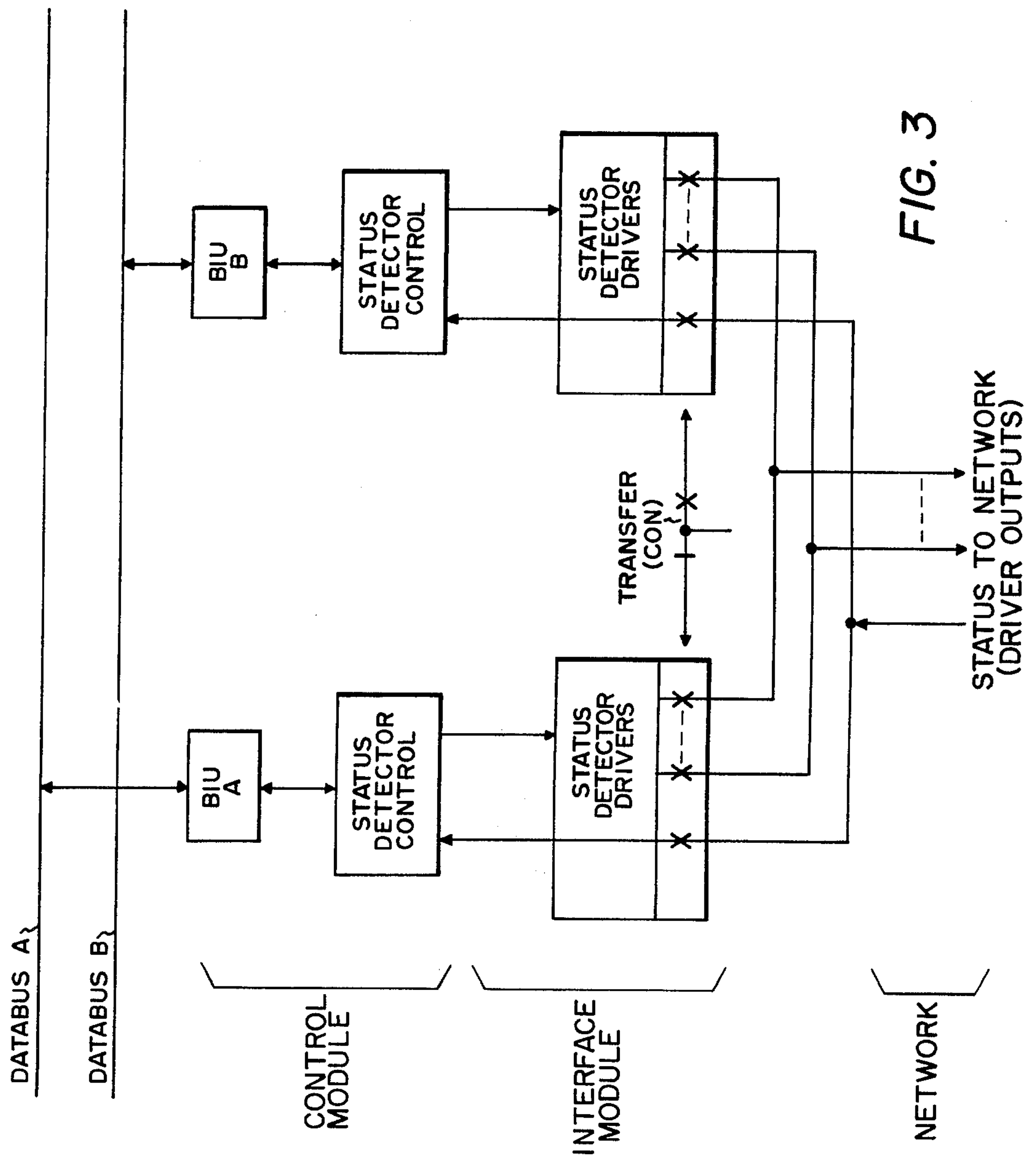
FIG. 3 is a block diagram of the invention coupled to a data bus.

FIG. 3 shows a status detector module as used in System S2. This is a fully duplicated system with the exception that the network wiring and sense points are shared by the two status detectors. As shown one detector subsystem is associated with each data bus A and B. If the central processor A is on line then the status detector associated with data bus A will be on line. The SDD relays are operated to gate the on line detector on to the common network cabling. A general operation of the status detector to find the state of the status relay is accomplished by the following steps:

1. Using the appropriate page digit (as shown in Table 1), the processor places the address of the equipment for which it requires status in the address register of the SDC.

2. The central processor activates the detector by requesting from the status detector a "data in" cycle to the processor.

3. The request in (2) triggers a sequence controlled by the SDC. A pulse has been sent through a selected network matrix which is made up in part by the contacts of status relays in the equipment addressed in (1) above.

4. If the contacts of the status relay are closed, the pulse will return to the receiver and the status will be stored in the SDC. If the contacts are open, the pulse will not return and this status will be stored in the SDC.

5. At the end of this cycle when the status is stored in the SDC register, a signal (ACKC) from the SDC is given to the processor to achnowledge that the information is ready for the "data in" cycle. The processor then gates the information on to the bus.

6. The status detector however does not go idle immediately. It times in order to allow the inductive circuits in the status detector receivers to clear down. During this period, a new address can be gated into the SDC address register and a "data in" cycle requested. However, the sequence for obtaining the status will not be started until the end of the timed interval.

A central processor which may produce the signals required for the system is shown in co-pending application to Borbas et al for a Central Processor for a Telephone Exchange, Ser. No. 510,092, filed the same day as this application, and the bus control units (BCU) and bus interface units (BIU) are shown in U.S. Pat. No. 3,812,297, issued May 21, 1974, by Borbas for a Bus Control Arrangement for a Communication Switching System.

the multiplexers in the RVR it will select one of the 12 available inputs on each of two multiplexers and produce the 2 bit status at the output. Bits 13, 14, 15, and 16 are decoded to a 1 out of 12 tens output (i.e. tens 1 to C). Bits 17, 18, 19, and 20 are decoded to a 1 out of 10 units output (i.e. units 1 to $\theta$). The 12 tens outputs Table 1

Data Bits (Input and Output).

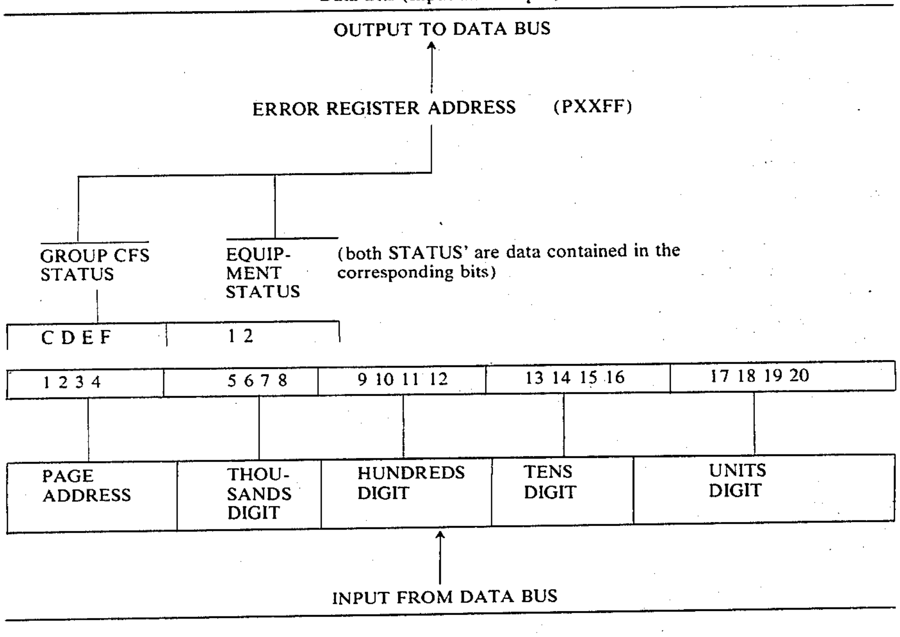

Figure 4:
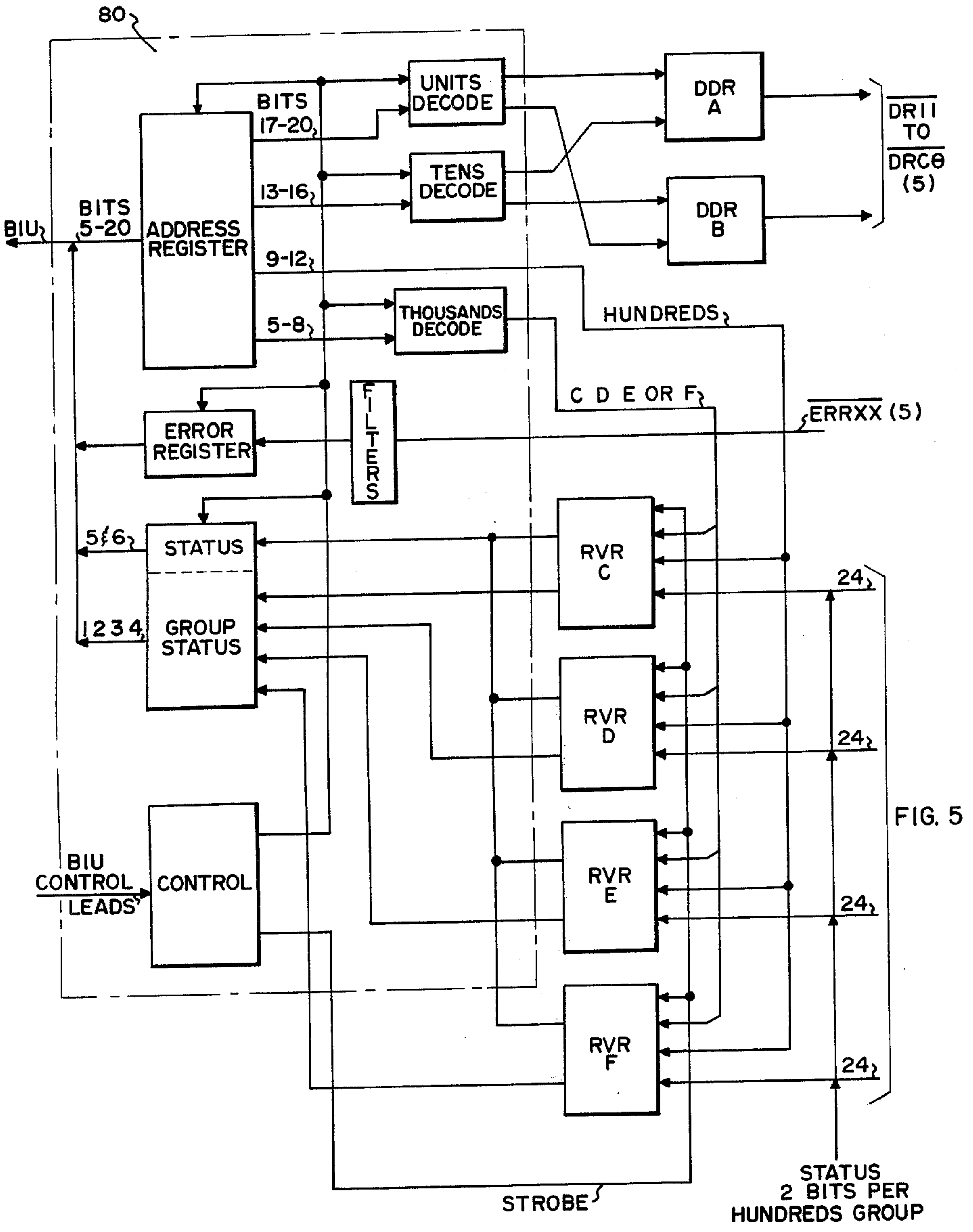
FIG. 4 is a block diagram of the status detector control in a system utilizing the invention.

FIG. 4 shows the status detector control 80 in more detail with the particular bit lines from the BIU (as shown in Table 1) and including the error signals from the SDD which are stored in the error register. Generally, two DDR's and four receivers (RVR) are provided with each status detector. In this set up the DDR's will further decode the output from the detector control 80, to 1 out of the 120 outputs. The four receivers C–F each receive at 24 volt levels the status from the network of 12 lines or junctors simultaneously (24 bits of information) and convert the signals to 5 volt logic levels. They provide a single bit output to the control 80 if any of these 12 lines is calling for service (CFS) (group call for service). With additional decoding from the control 80 of the hundreds and thousands digits, the receivers provide the true status of a single OJ, TJ, RJ, or line circuit. One RVR is provided for each 1200 lines or more specifically for each thousands group address. Addressing is presented in a 20 bit format as shown in Table 1 with the status detector page digit always being 2. Thus the addresses are presented to the control in the format to THTU. The last T (tens) and U (units) select a status detector driver. The H (hundreds) provides the group selection and the first T (thousands) selects a receiver C, D, E, or F. The address is received in the parallel 20 bit format with the hexadecimal 2 in the bits 1 to 4 fields. Bits 5 to 20 inclusive are stored in the address latches. Bits 5, 6, 7, and 8 are decoded to give a C, D, E, or F output. One and only one output is true at once and this signal is used to select the correct RVR. Bits 9, 10, 11, and 12 are not decoded. They are multipled in 4 bit binary form to all receiver cards. This is the hundreds group information and when applied to and the 10 units outputs are wired to the two two DDR's where further decoding produces a 1 out of 120 output. (60 outputs per DDR).

Figure 5:
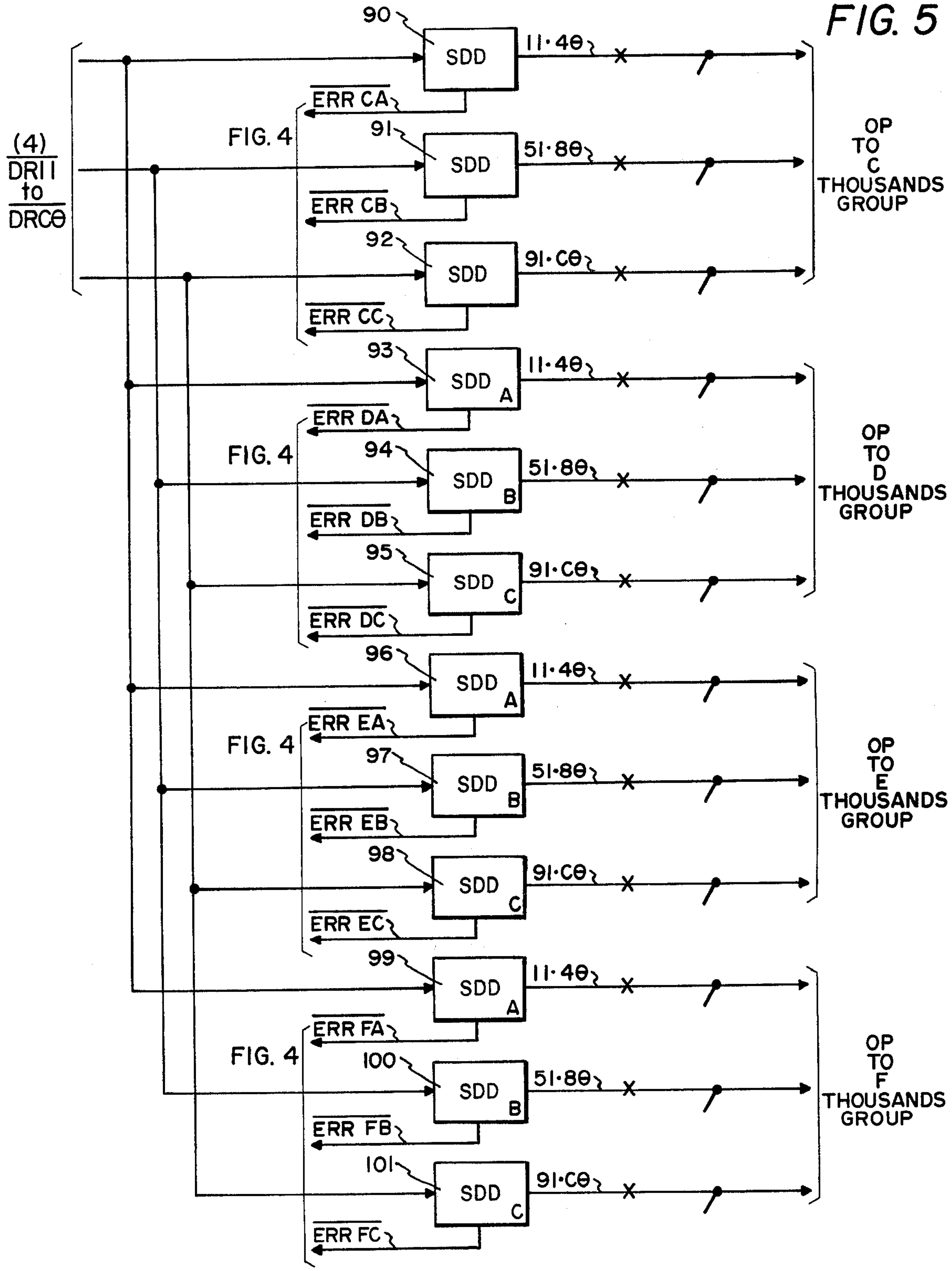
FIG. 5 is a block diagram of a status detector driver configuration in a system utilizing the invention.

The particular configuration for the SDD's are shown in FIG. 5. The SDD's 90–101 receive a negative going 24 volt pulse from the DDR and invert it to provide a nominal positive 24 volt pulse at the output. They may also monitor the driver output (DOP) leads which go into the network and give an error indication if an output is grounded or shorted to any potential below ground. In the event of a short or ground on an output, the SDD involved is clamped off (if fault detection is included) in order to prevent current from being delivered into the short. This provides a negative potential protection for the hardware. The SDD's also provide the isolation of the off-line SDD from the on-line SDD.

As mentioned earlier, a total of 120 decoded outputs are provided from the two DDR's. The SDD configuration could be considered as 4 separate blocks of drivers. Each block has 120 inputs and 120 outputs. The 120 DDR outputs are multipled to each of the four blocks of SDD's. Each of the 4 sets of the 120 driver outputs from the SDD drives a separate 120 line block (C, D, E, or F). These SDD outputs are grouped as follows:

TABLE 2

| Group | DOP | | |
|---|---|---|---|
| C | A | DOP 11 to DOP 4Θ | |
| | B | DOP 51 to DOP 8Θ | to C thousands group |
| | C | DOP 91 to DOP CΘ | |
| D | A | | |
| | B | as above | to D thousands group |
| C | | | |
| E | A | | |

TABLE 2-continued

| Group | DOP | | |
|---|---|---|---|
| | B | as above | to E thousands group |
| | C | | |
| F | A | | |
| | B | as above | to F thousands group |
| | C | | |

Each of these 12 SDD circuits are identical and interchangeable. Each SDD circuit provides 40 drivers which are further divided into 8 groups of 5 drivers. Each group may include a fault detection circuit which then controls all 5 drivers. The fault detection circuit maintains the OP leads at a potential of approximately +1.2 volts (when not being driven). Any short in the network which causes any one of these 5 OP's to go below this threshold of 1.2 volts will cause all five drivers in the group to be clamped off and an error output to be given. Although there are 8 groups for each SDD, their 8 error outputs are logically OR'd to present one error output. Taken in a complete set as in Table 2 above, this presents 4 sets of three error signals which are returned to the SDC ($\overline{\text{ERRXY}}$ where X is C, D, E, or F, and Y is A, B, or C).

Figure 6:
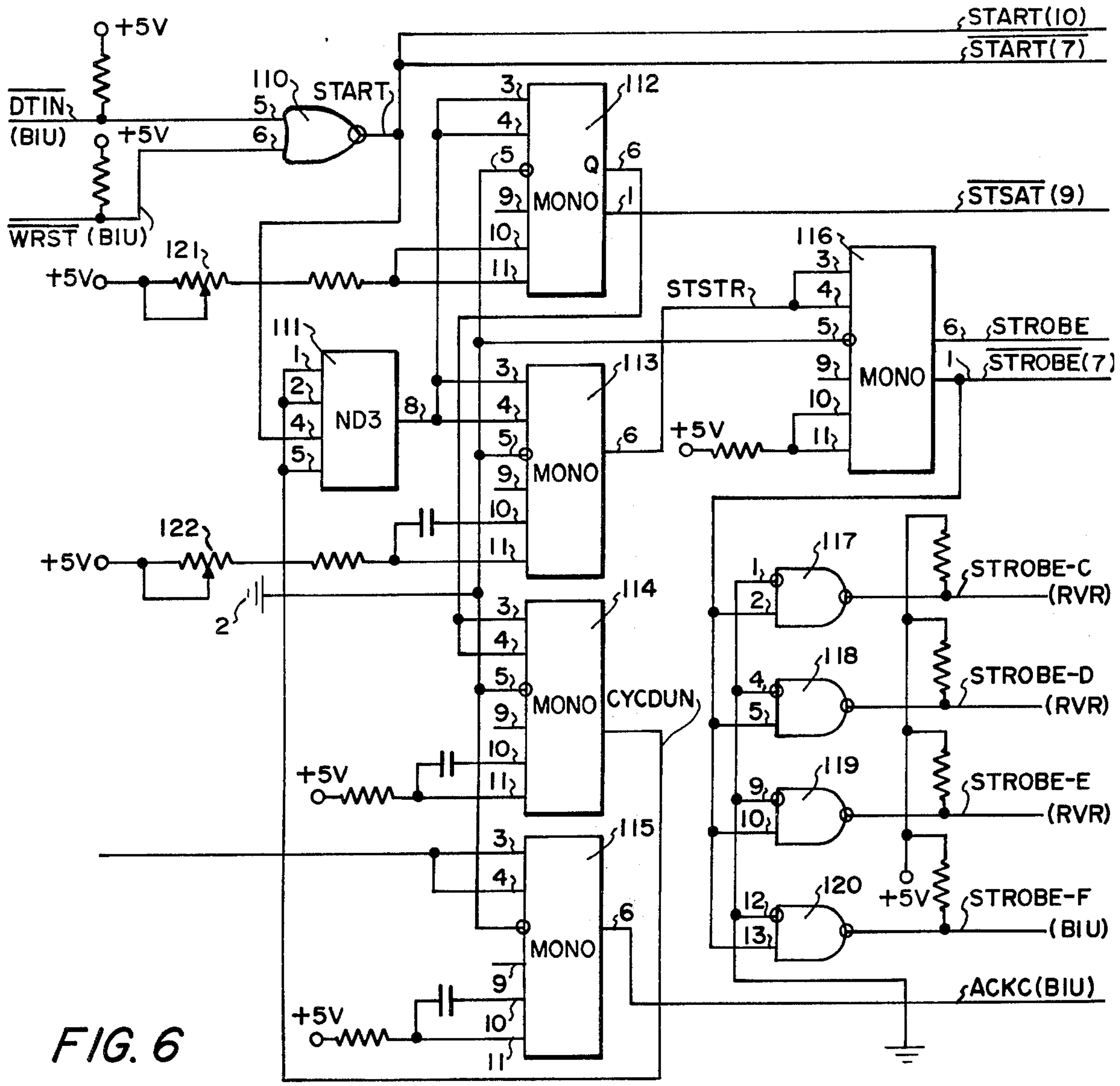
FIG. 6 is a schematic diagram of the timing control of the status detector control.

FIG. 6 shows the timing control for the SDD. The circuit is composed of commercial 7400 circuits including gate 110 which is a 7402 two input NOR gate, gate 11 which is a 7420 four input NAND gate, monostables 112–116 which are 74121 monostable multivibrators, and gates 117–120 which are 7438 two input NAND buffer gates with open collectors.

The timing cycle is initiated by the presence of both signals $\overline{\text{DTIN}}$ and $\overline{\text{WRST}}$ at the input of gate 110. The output of this gate is the command START. Between status checks monostable 114 produces a high output to gate 111. This output is gated with the signals START to generate a low from gate 111. When the low occurs at the output of gate 111, it triggers monostables 112 and 113. The Q output of each of these monostables changes from a low to a high. Monostable 112 generates the $\overline{\text{STSAT}}$ (start saturation) command used to enable the tens and units decode. Monostable 113 outputs signal STSTR which positions the occurrence of the actual signal STROBE from monostable 116 so that false status readings do not occur. Timing may be adjusted with variable resistors 121 and 122. Monostable 114 is triggered by the low from monostable 112, and removes the CYCDUN (cycle done) command which inhibits access of the status detector until 15 microseconds have passed and the present status check is completed. The removal of the high from the output of monostable 113 after monostable 113 times out, triggers monostable 116 to cause a strobe pulse of about 1 microsecond (signal STROBE and $\overline{\text{STROBE}}$. When the signal STROBE from monostable 116 times out it triggers monostable 115 which outputs signal ACKC (acknowledge) to the BIU. NAND gates 117–120 have a permanent high on their first input. The signal $\overline{\text{STROBE}}$ on the second input is inverted to provide the signals STROBE C–F required to enable the four receivers.

Figure 7:
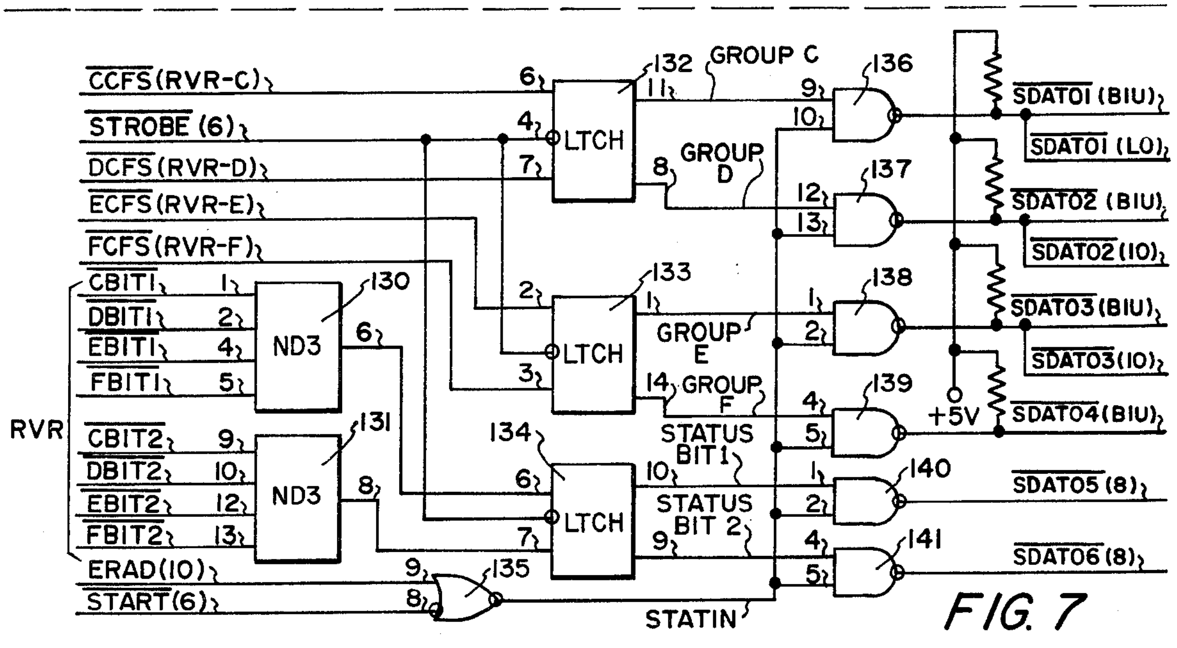
FIG. 7 shows a status register for the status detector control.

FIG. 7 shows the status register of the SDC. The circuit is also composed of commercial 7400 Series Transistor Transistor Logic (TTL). These include gates 130 and 131 which are 7420 four input NAND gates, latches 132–134 which are 7475 bistable latches, gate 135 whch is a 7402 two input NOR gate, and gates 136–141 which are 7438 two input NAND buffer gates with open collectors.

Signal $\overline{\text{STROBE}}$ is inverted at the inputs of latches 132–134 to provide the clock pulse for the latches. The status register stores the group call for service code (CFS) and the individual line or junction status information prior to its placement on the data bus. Latches 132–134 store the data when pulsed by the signal $\overline{\text{STROBE}}$. Latch 132 stores the C and D group CFS (CCFS and DCFS) and latch 133 stores the E and F group CFS (ECFS and FCFS). Latch 134 stores the line or junctor status of the particular pulsed equipment. The group call for service is at a low logic level when it enters the circuit and sets the output of latches 132 and 133 high. The equipment status is inverted by gates 130 and 131 and fed into the input of latch 134 as highs. Therefore the outputs of latch 134 are also set high. The outputs of the latch circuit are connected to the inputs of the gates 136–141 which operated when activated by the signal STATIN from gate 135. The signal STATIN will occur only if the signal ERAD is low indicating that the error register is not requested and low signal $\overline{\text{START}}$ is present. A low output from gates 136–139 indicates which thousands group (C, D, E, or F) has called for service. For example, if signal $\overline{\text{STAT01}}$ is low, the C group has called for service. Table 3 shows the group CFS bits and line or junctor status indicated by $\overline{\text{STAT05}}$ and $\overline{\text{STAT06}}$.

TABLE 3

| Status Register | bits | 5 | 6 | |
|---|---|---|---|---|
| | RJ | 1 | 0 | idle |
| | | 0 | 0 | busy |
| | OJ | 1 | X | idle |
| | | 0 | X | busy |
| | TJ | X | 1 | idle |
| | | X | 0 | busy |
| | both OJ/TJ | 1 | 1 | idle *see note |
| | | 0 | 0 | busy |
| | Line | 1 | 1 | call for service (cfs) |
| | | 1 | 0 | idle |
| | | 0 | 0 | busy |
| | | 0 | 1 | lock out |
| "all cfs test"THCΘ | | 1 | 1 | pass test |
| stuck driver test (using illegal address) e.g. THOO | | 0 | 0 | pass test |

Note: both OJ/TJ idle produces the same bit pattern as a line call for service. Processor will ignore cfs information when not scanning for cfs.

Figure 8:
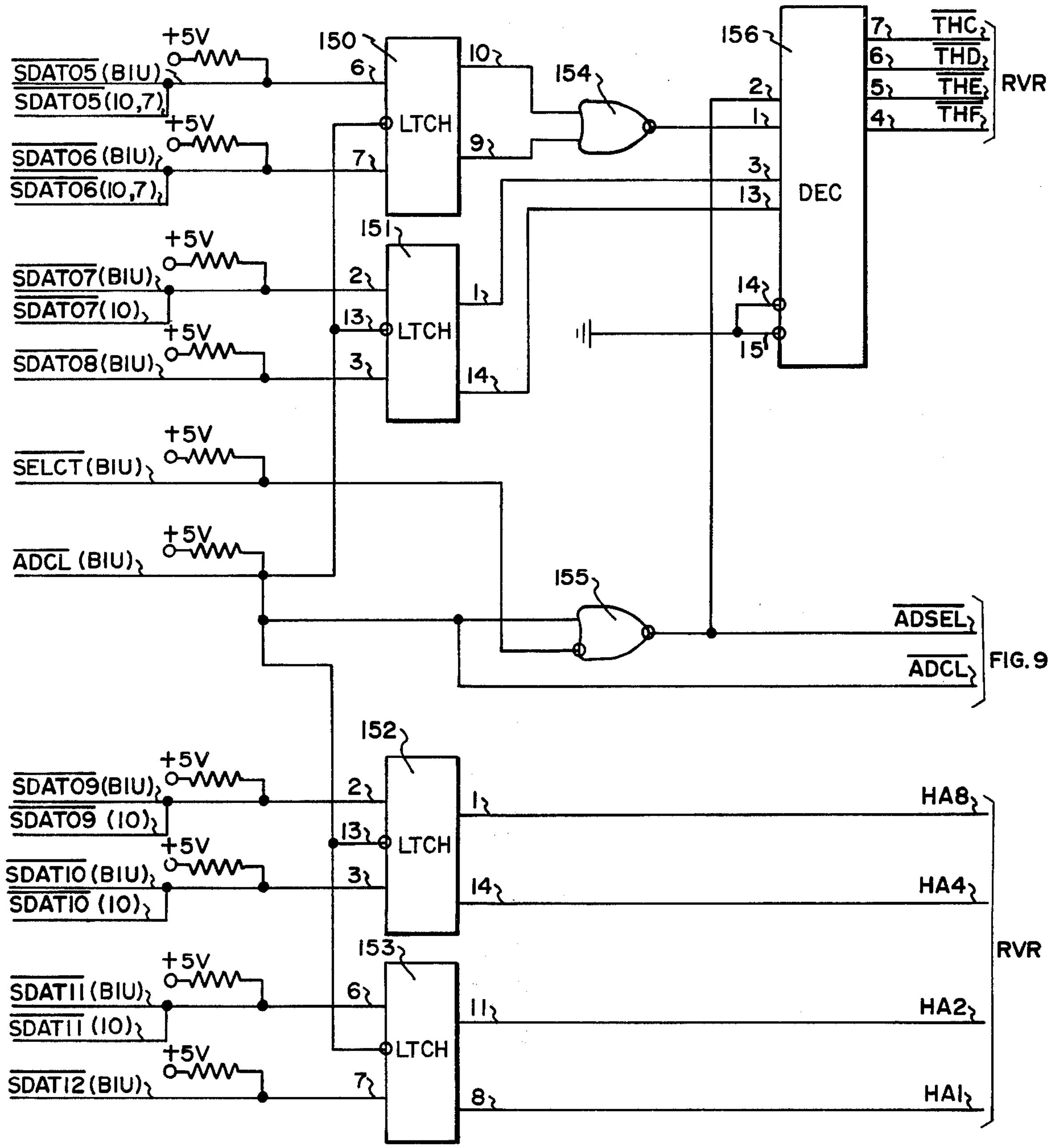
FIG. 8 shows hundreds and thousands decoding for the status detector control.

FIG. 8 shows the thousands and hundreds decoding of the SDC. This circuit is also composed of commercial 7400 circuits including latches 150–153 which are 7475 bistable latches, gate 154 which is a 7402 two input NOR gate, gate 155 which is a 7400 two input NAND gate, and decoder 156 which is a 74155 dual two line to four line decoder. This circuit also receives its data from the bus via the BIU. Signal $\overline{ADCL}$ from the BIU inverted at the inputs of latches 150–153 provides the positive clock pulse to transfer the data from leads $\overline{STAT05\text{-}STAT12}$ to the inputs of latches 150–153. The thousands data is decoded by using the -Q output leads of latch 150 and the $\overline{Q}$ output leads of latch 151. The combined Q outputs through gate 154 provide one inpput to decoder 156. A low strobe pulse is presented to decoder 156 when gate 155 produces signal $\overline{ADSEL}$ by signal $\overline{SELCT}$ present at the input of gate 155 and signal $\overline{ADCL}$ removed. Addressing of the decoder input from gate 154 to one of the four decoder outputs ($\overline{THC}$, $\overline{THD}$, $\overline{THE}$, or $\overline{THF}$) is accomplished by means of the outputs from latch 151. The selected output enables one of the four receivers. Signal $\overline{ADCL}$ inverted at the inputs of latches 152 and 153 gates the hundreds data through the latches. This data appears inverted on the outputs of the latches and is fed to the receivers via leads HA8, HA4, HA2, and HA1.

Figure 9:
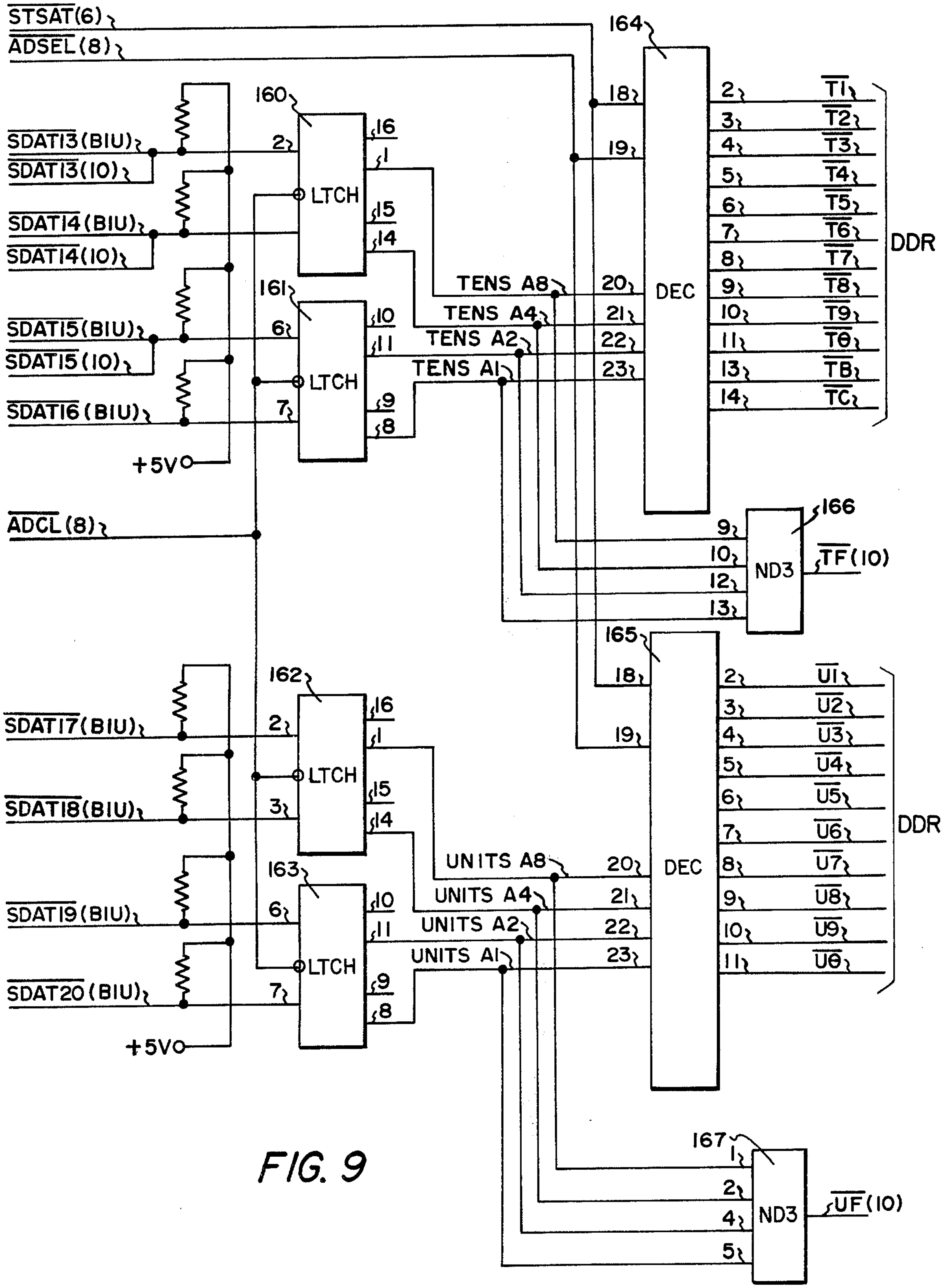
FIG. 9 shows tens and units decoding for the status detector control.

FIG. 9 shows the tens and unit decoding of the SDC which is also composed of 7400 commercial logic. The circuit includes latches 160–163 which are 7475 bistable latches, decoders 164 and 165 which are 74154 four line by 16 line decoders, and gates 166 and 167 which are 7420 four input NAND gates. As for the thousands and hundreds decoding, the tens and units data from the BIU is gated by inverted signal $\overline{ADCL}$ through the latches 160–163 via leads $\overline{SDAT13\text{-}SDAT20}$. The $\overline{Q}$ outputs from the latches are the decoder address leads to select one out of 12 outputs for the tens decode and one out of ten outputs for the units decode. The decoders are enabled by signals $\overline{STSAT}$ and $\overline{ADSEL}$. The selected decoder output will be at a low level, and the other outputs at a high. The selected $\overline{TX}$ and $\overline{UX}$ leads are fed to the DDR's. Two gates 166 and 167 monitor the status of the outputs from the latches. If all the outputs of latches 160 and 161 are high, gates 166 enables and generates the $\overline{TF}$ signal. Similarly, signal $\overline{UF}$ is generated when all the outputs of latches 162 and 163 are high. The $\overline{TF}$ and the $\overline{UF}$ signals are required to latch up the error register information in preparation for reading by the central processor.

Figure 10:
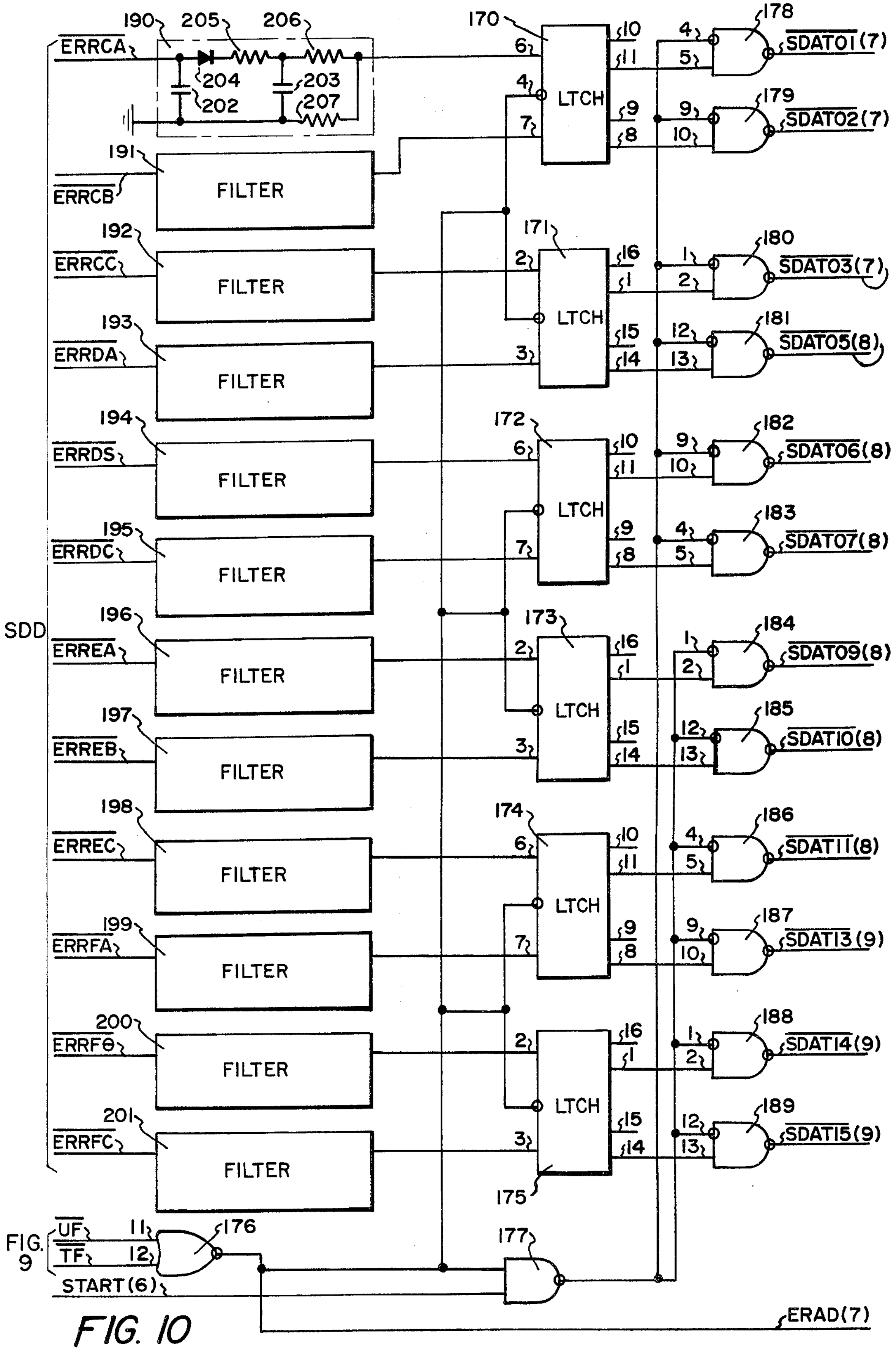
FIG. 10 shows an error receiver for the status detector control.

FIG. 10 shows the error receiver of the SDC also composed of 7400 commercial logic including latches 170–175 which are 7475 bistable latches, gate 176 which is a 7402 two input NOR gate, gate 177 which is a 7400 two input NAND gate, gates 178–189 which are 7438 two input NAND buffer gates with open collectors, and filters 190–201 of our design. The components of filter 190 is shown while the identical filters 191–201 are shown merely as blocks. There are a total of 12 error receivers as shown in the FIG. The input of each error receiver contains a filter composed of capacitors 202 and 203, diode 204, and resistors 205–207. Resistors 206 and 207 comprise a voltage divider while the two capacitors filter the +24 volt signal from the SDD's. The voltage divider circuit and resistor 205 allow a signal of about +4.5 volt to appear at the input of the latches 170–175. In the normal state, the signals $\overline{UF}$ and $\overline{TF}$ at gate 176 are at a high level, which puts a low on the output. This output is inverted to the clear leads of latches 170–175 which opens the latches. Any error conditions which are present on the error leads $\overline{ERRXX}$ from the fault detector in the SDD will now pass through the latches on to one input of the gates 178–189. The outputs of these NAND gates are not read until the central processor accesses the fault register to determine if there are any errors in the SDC. The processor presents the fault register address 2XXFF to the subsystem. Decoding of the tens and units on FIG. 9 indicates the presence of signals $\overline{TF}$ and $\overline{UF}$. A low on these leads changes the output of gate 176 to a high. This signal (ERAD) is combined by gate 177 with a START command from the timing control to give a low which is inverted to the second inputs of gates 178–189. These gates are now enabled and the status of the $\overline{SDAT}$ leads 01–15 can be read by the central processor. As shown $\overline{SDAT}$ 4, 8, 12, and 16 are not used. This allows a grouping of 4 sets of three error indications as mentioned previously. This is used for print out formating only. Since the input from gates 177 to the gates 178–189 is at a high level, the inputs from the latches will be inverted. When the signals $\overline{TF}$ and $\overline{UF}$ are present (low) the clock input to the latches goes low holding the error condition from the leads $\overline{ERRXX}$ in the latches.

Figure 11:
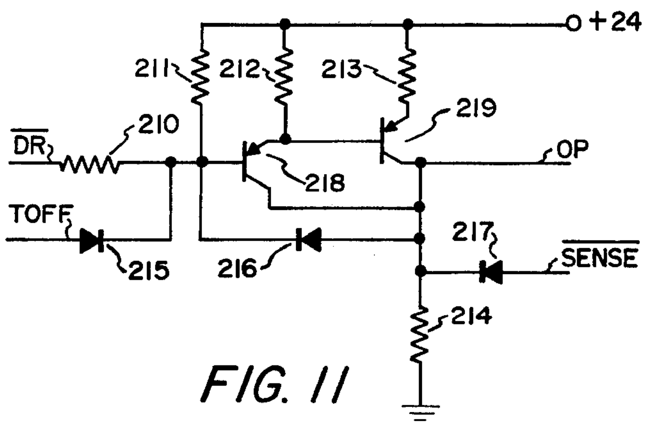
FIG. 11 is a schematic diagram of one status detector driver.

FIG. 11 shows one SDD as shown on FIG. 5 and FIG. 2. This circuit is comprised of resistors 210–214, diodes 215–217, and transistors 218 and 219. The pulse output by this SDD circuit is positive not a negative as in previous systems. Withoout diodes 215, 216, and 217 this circuit is a basically standard Darlington driver circuit with a 2 ampere drive capability. Diodes 215 and 217 are associated with fault detection and protection. Diode 216 provides a clear down path for the considerable cable capacitance in a large system after it is charged up by the +24 volt pulse. This is necessary for speed of oepration and this clear down time determines the length of the protected interval as controlled by the CYCDUN timer as shown in FIG. 6. This allows the greatest problem area −50 volt shorts and grounds to be protected against. The output signal OP is held slightly off ground and the fault detection circuit of the co-pending application to a Status Detector Fault Detection to Moorehead already mentioned may detect the output going to or below ground. This circuit produces low signal TOFF which back biases diode 215 at the input of the SDD. In normal operation, after decoding, a low is produced by the DDR as signal $\overline{DR}$ at the input of the SDD. This produces a high at the output, signal OP. The positive pulse OP also back biases diode 217 and has no effect on the fault detector circuit. However, if at any time a −50 volt or ground is shorted to the wiring between the output of SDD and the receiver, the line OP will go to below ground and forward bias diode 217, sending signal $\overline{SENSE}$ to the fault detection circuit. In turn the fault detector will pull signal TOFF high forward biasing diode 215 which turns off the SDD. Further details are disclosed in the above-mentioned co-pending application to the fault detector.

Figure 12:
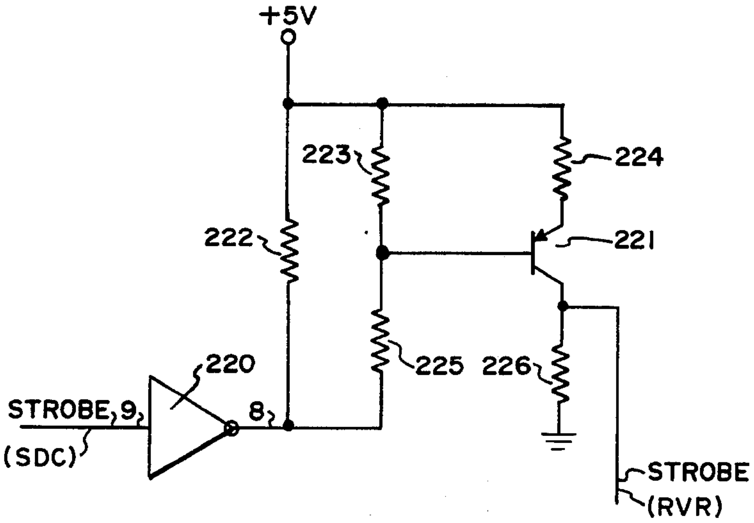
FIG. 12 shows the drive circuit for the strobe signal to the receiver.

FIG. 12 shows the strobe drive circuit for the secondary of the transformer. This circuit will provide current for up to six transformer secondaries. The STROBE pulse is inverted to a low by inverter 220 which is a 7404 hexinverter, and provides the ground reference required to bias the base of transistor 221 such that transistor 221 turns on. This is a standard driver circuit required for additional current drive into an inductive load.

Figure 13:
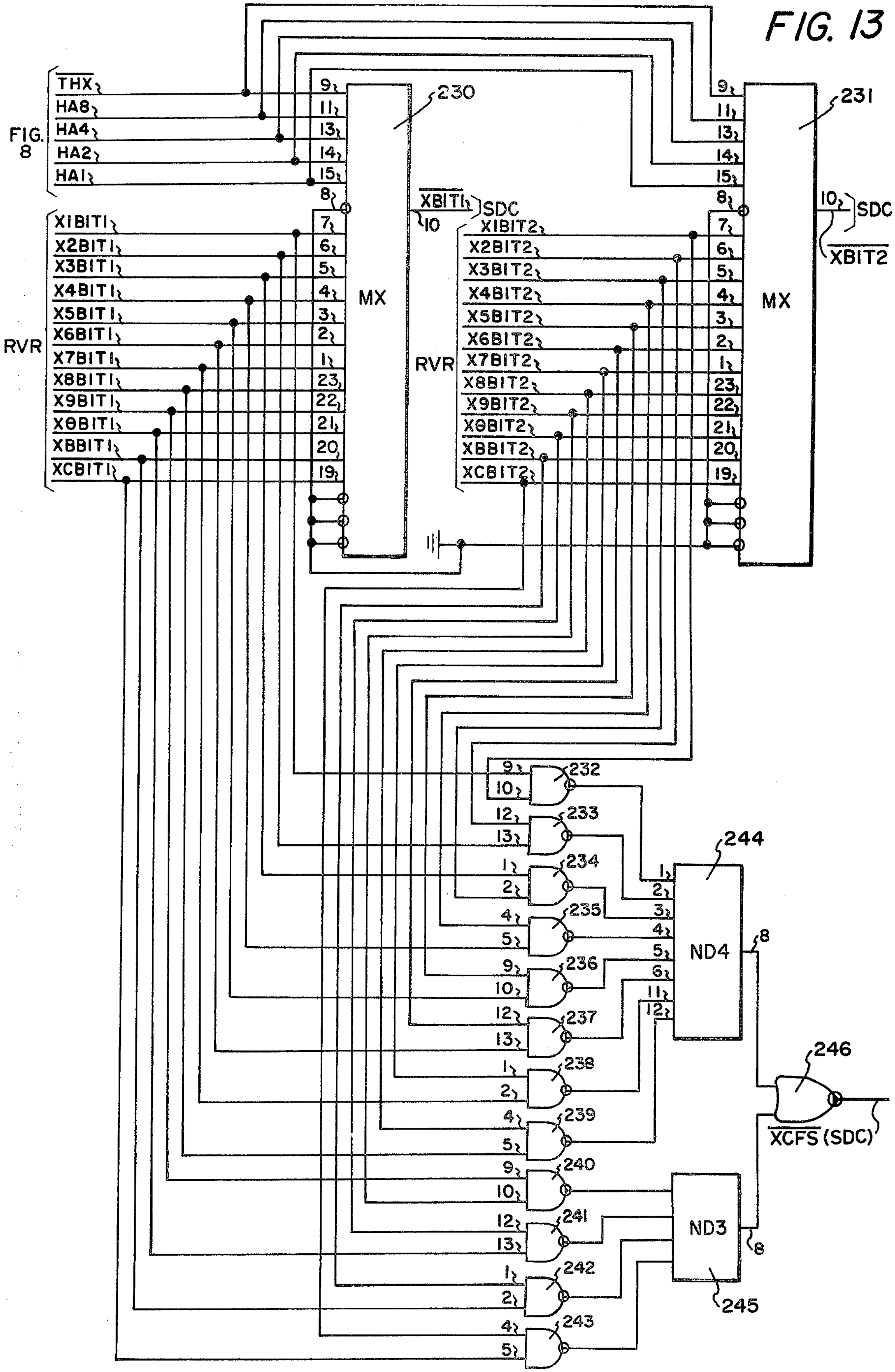
FIG. 13 shows the status circuits of the receiver.

FIG. 13 is a schematic diagram of the status circuits of the receiver. This circuit is also composed of commercial 7400 logic including multiplexers 230 and 231 which are 74153 dual four to one multiplexers, gates 232–243 which are 7400 two input NAND gates, gate 244 which is a 7430 eight input NAND gate, gate 245 which is a 7420 four input NAND gate, and gate 246 which is a 7402 two input NOR gate. Data for the multiplexers is provided by the status receivers as shown in FIGS. 2 and 4. The addressing required to selected one of the data input leads (XIBT1/2 through XCBIT1/2) is provided by the hundreds decoding signals (HA8, HA4, HA2, and HA1). The thousands decode signal ($\overline{THX}$) provides the required low STROBE pulse. The selected inputs appear inverted on the output leads. The status of these leads is then fed to the SDC temporary storage via leads $\overline{XBIT1}$ and $\overline{XBIT2}$ (where X is C, D, E, or F). The group call for service (CFS) circuits consists of gates 232–243, 244, 245, and 246. This circuit detects only the call for service indication of a line group (100 lines). The gates 232–243 are also fed by the receivers and require a high logic signal on both inputs in order to operate and provide a low on either gate 244 or gate 245. This pulse, after passing through one of these two gates is gated through gate 246 as low signal $\overline{XCFS}$ indicating the call for service which is then sent to the SDC. This information reduces the amount of scanning done by the central processor.

Figure 14:
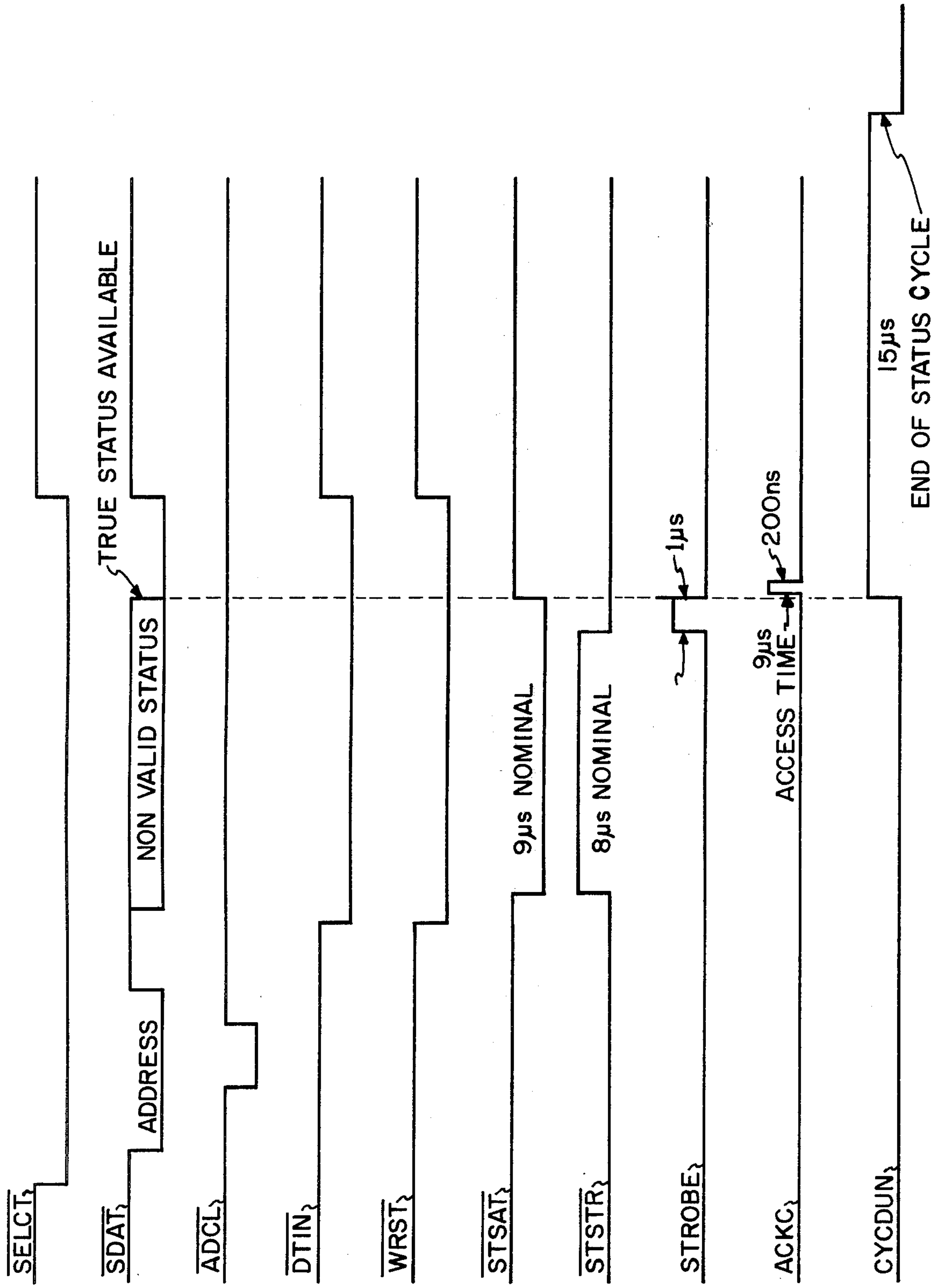
FIG. 14 shows a timing chart for a status detector system.

FIG. 14 shows the timing sequences for the status detector system. Two bus cycles are used in retrieving status data. First, an address cycle where the address of the equipment whose status is required is stored in the SDC. Second, a data-in request from the processor, which cycle will take the status information from the status register in the SDC into the processor. The sequence of events as shown in FIG. 14 is started by signal $\overline{SELCT}$ which ceases the status detector and the address information is placed on the $\overline{SDAT}$ lines. The address bits 5–20 are clocked into the storage latches by signal $\overline{ADCL}$. The data-in cycle is intitated by the presence of both signals $\overline{DTIN}$ and $\overline{WRST}$ along with the absence of signal CYCDUN. The latter will be absent if sufficient time (15 microseconds) has passed since the last data cycle. When these criterion have been met, the start saturation signal $\overline{STSAT}$ is initiated and continues for nine microseconds. This signal gates the tens and units decoded outputs which drive the DDR and from there the SDD circuits. The SDD circuits are thus turned on for approximately 9 microseconds. This is a sufficient time to overcome network cable inductance and if the contact being sensed is closed, for the pulse transformer on the corresponding receiver to be saturated. Signal $\overline{STSTR}$ (start strobe) is used to position the one microsecond strobe pulse. Normally this is adjusted so that the strobe occurs just before signal $\overline{STSAT}$ ceases. The strobe pulse is sent by drivers to each RVR where it strobes a secondary of the pulse transformers and gates the information into the Schmitt triggers. If the hundreds group addressing is present at the receiver and the thousands group decode has selected the receiver, the two bit status passes directly back to the SDC status register. The status information will be present at the input of the status register storage latches before the end of the one microsecond strobe pulse. The trailing edge of the strobe pulse effectively locks the status into the storage latches. The trailing edge of the strobe also triggers a monostable which sends a timed acknowledged signal ACKC to the processor. This tells the processor the status information is ready on the bus and can be read in by the processor. The trailing edge of the saturation pulse $\overline{STSAT}$ triggers the cycle done (CYCDUN) monostable. This prevents the initiation of any other status cycle until the inductive elements of the network and receiver have cleared down (about 15 microseconds). During this interval, a new address can be loaded into the status detector and a data-in cycle requested however, the signal $\overline{STSAT}$ will not start until the CYCDUN timing is completed. The worse case cycle time, assuming the status detector is reaccessed immediately upon completion of a cycle, will be approximately 9 + 15 (24 microseconds) as access time is nominally 9 microseconds. It should be noted that both the length of signal STSAT and the position of the 1 microsecond strobe can be varied with potentiometers in the SDC (FIG. 6).

While principles of the invention have been illustrated above in connection with specific apparatus and applications, it is to be understood the description is made only by way of example and not as a limitation on the scope of the invention as encompassed by the following claims.

I claim:

1. A status detector for a communication switching system, said system comprising a data bus and a multiplicity of sense points, said status detector comprising:
status control means coupled to said data bus;
decoder means coupled to said status control means;
detector driver means coupled to said decoder means and to said sense points; and
receiver means coupled to said sense points and said status control means to determine the status of said sense points;
whereby the status of said sense points may be stored in said status control means from said receiver means.

2. A status detector as claimed in claim 1 further comprising:
fault detector means coupled to said detector driver means;
whereby said status detector is protected from foreign potentials.

3. A status detector as claimed in claim 1 wherein said receiver means comprises:
pulse transformer means coupled to said sense points;
trigger means coupled to said pulse transformer means; and
multiplexer means coupled to said trigger means and said status control means.

4. A status detector as claimed in claim 1 wherein said status control means comprises:
address receiver means;
address decoder means;
status information storage means;
error information storage means; and
strobe signal generation means;
whereby the status of said sense points may be stored in said status control means from said receiver means.

5. A status detector as claimed in claim 4 wherein said receiver means comprises:
pulse transformer means coupled to said sense points and said strobe signal generation means;
trigger means coupled to said pulse tranformer means; and
multiplexer means coupled to said trigger means, said status information storage means, and said address decoder means.

* * * * *